United States Patent
Le Mer et al.

(10) Patent No.: US 7,909,005 B2
(45) Date of Patent: Mar. 22, 2011

(54) CONDENSATION HEAT EXCHANGER INCLUDING 2 PRIMARY BUNDLES AND A SECONDARY BUNDLE

(75) Inventors: Joseph Le Mer, Plouezoch (FR); Rocco Giannoni, Milan (IT)

(73) Assignee: Giannoni France (FR)

( * ) Notice: Subject to any disclaimer, the term of this patent is extended or adjusted under 35 U.S.C. 154(b) by 449 days.

(21) Appl. No.: 12/072,913

(22) Filed: Feb. 28, 2008

(65) Prior Publication Data

US 2008/0223314 A1 Sep. 18, 2008

(30) Foreign Application Priority Data

Feb. 28, 2007 (FR) ...................................... 07 01436

(51) Int. Cl.
*F24D 19/00* (2006.01)
(52) U.S. Cl. ......... 122/31.1; 122/32; 122/18.1; 165/163
(58) Field of Classification Search .................. 122/15.1, 122/18.1, 31.1, 32, 33, 247, 248; 165/163
See application file for complete search history.

(56) References Cited

U.S. PATENT DOCUMENTS

| | | | | |
|---|---|---|---|---|
| 4,388,066 | A | * | 6/1983 | Natarajan et al. .................. 432/1 |
| 5,307,802 | A | * | 5/1994 | Placek ........................... 126/600 |
| 7,281,497 | B2 | * | 10/2007 | Le Mer et al. ................ 122/31.2 |
| 7,302,916 | B2 | * | 12/2007 | LeMer et al. ................. 122/18.1 |
| 7,617,802 | B2 | * | 11/2009 | Le Mer et al. ................ 122/18.1 |
| 2008/0223314 | A1 | * | 9/2008 | Le Mer et al. .................... 122/53 |

* cited by examiner

*Primary Examiner* — Gregory A Wilson
(74) *Attorney, Agent, or Firm* — Lerner, David, Littenberg, Krumholz & Mentlik, LLP

(57) ABSTRACT

This exchanger comprises a pair of primary tubular bundles (5a, 5b) surrounding a fuel or gas burner (4a, 4b), and a secondary tubular bundle (6) on which condensation of the steam contained in the burned gases discharged from the primary bundles occurs, wherein the three bundles (5a, 5b, 6) are mounted parallel, side-by-side inside a gas-tight casing (10), and communicate with one another, with means being provided in order to circulate the water to be heated, between the tubes forming the secondary bundle (6) and the tubes forming the primary bundles (5a, 5b); the casing (10) is subdivided at the level of the secondary bundle (6) by a partition (7-70) that extends both inside and outside said bundle (6), with the arrangement being such that a only a circumferential section of the latter is capable of being contacted and traversed by the hot gases coming from one of the two primary bundles (5a), and its remaining section being capable of being contacted and traversed only by the hot gases coming from the other primary bundle (5b).

Household or industrial heating installation with high efficiency and low bulk.

21 Claims, 9 Drawing Sheets

FIG. 1

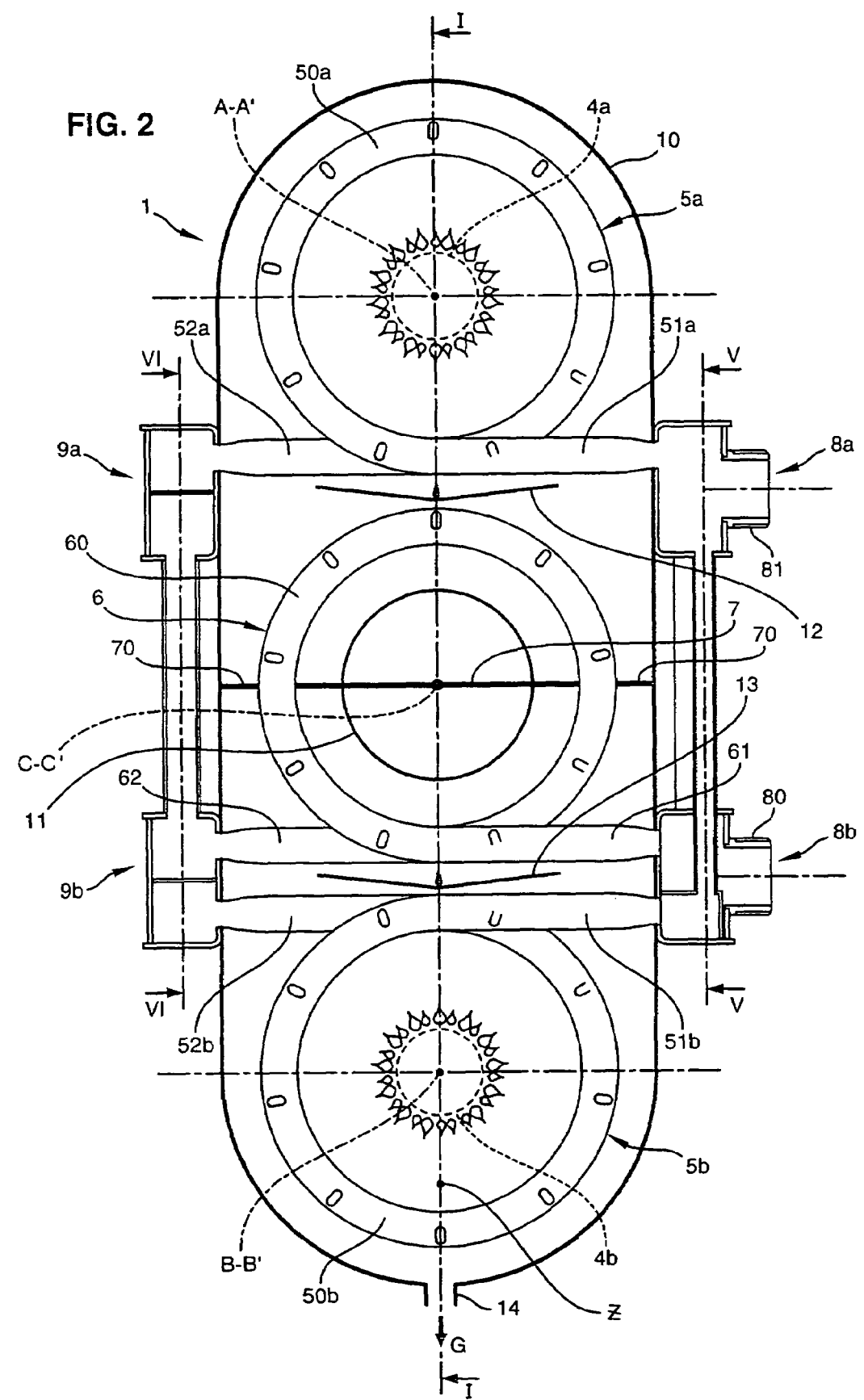

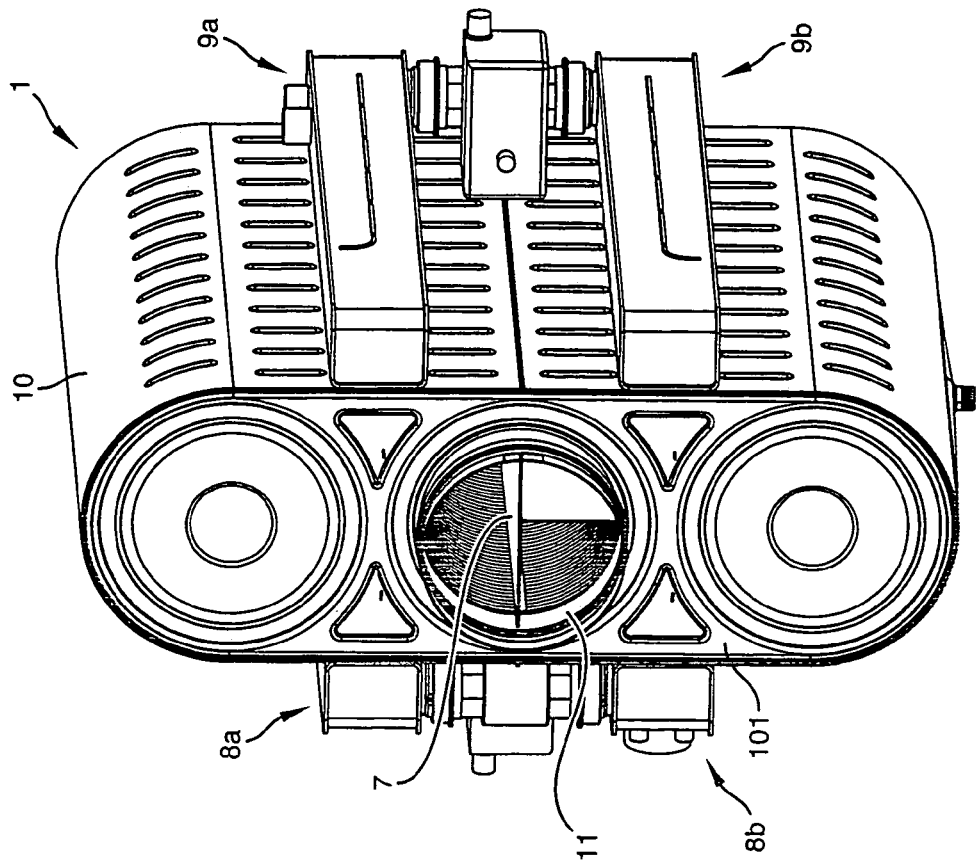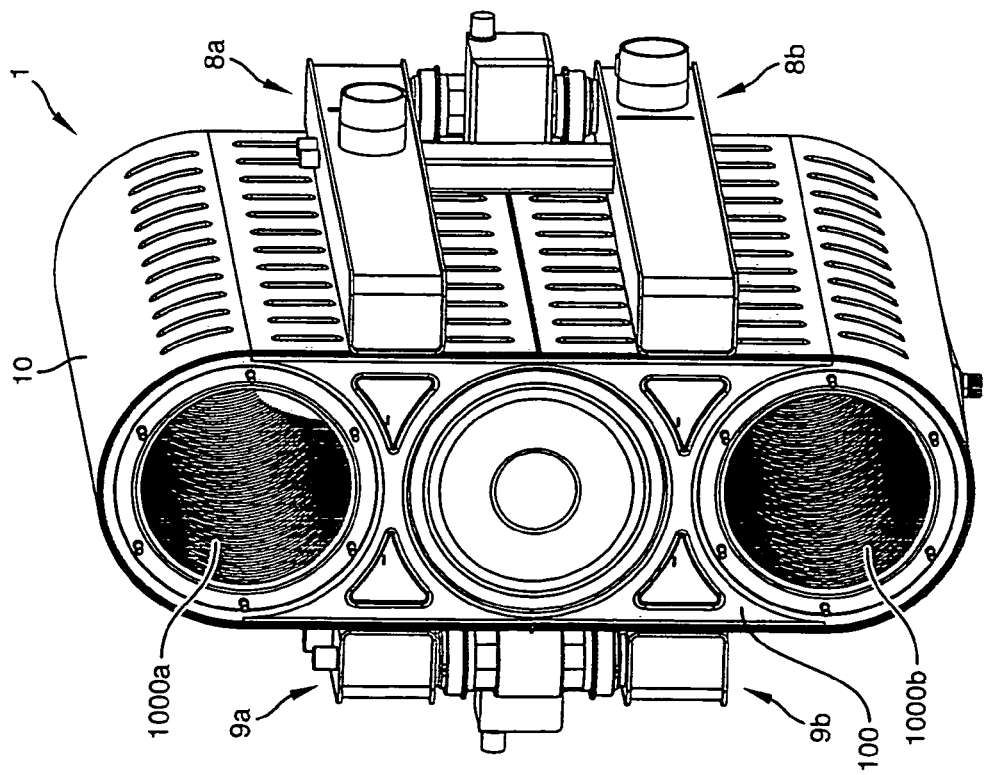

CONDENSATION HEAT EXCHANGER INCLUDING 2 PRIMARY BUNDLES AND A SECONDARY BUNDLE

CROSS-REFERENCE TO RELATED APPLICATION

The present application claims the benefit of the filing date of French patent application FR 07/01436 filed on Feb. 28, 2007, the disclosure of which is hereby incorporated by reference herein.

BACKGROUND OF THE INVENTION

The heat exchanger of the present invention is a condensation exchanger, designed to equip a gas or fuel boiler, in particular for industrial or domestic uses, for example in order to feed a central heating circuit and/or to provide water for sanitary use.

It is more specifically a triple exchanger, consisting of two main exchangers, each directly exposed to the hot gases generated by a gas or fuel burner, and a secondary exchanger, which is exposed to the gases, of a clearly lower temperature, that come from at least one of these main exchangers, or even both at the same time.

The water, or any other fluid to be heated, circulates entirely or partially in this secondary exchanger, where it is subjected to a preheating, then in a primary exchanger, where it is subjected to an actual heating.

As an example, the gases burned directly, coming from the burner, are at a temperature on the order of 1,000° C.

After having passed through a main exchanger, their temperature is generally between 100 and 180° C.

These hot gases contain a certain amount of water in the form of steam, which is capable of condensing when it comes into contact with the wall of the secondary exchanger, once it is below the dew-point temperature, on the order of 60° C.

This condensation has the effect of providing additional heat energy to the water circulating in the secondary exchanger, which additional heat energy corresponds to the latent heat of vaporization.

A double exchanger of this type, which is described for example in document EP 0 078 207, makes it possible to substantially improve the efficiency of the apparatus.

Document WO 94/16272 describes a heat exchanger element that consists of a tube made of a thermally conductive material, in which a heat-carrying fluid, for example the water to be heated, is intended to circulate.

This tube is wound in a spiral and has a generally oval planar cross-section, of which the large axis is substantially perpendicular to the axis of the spiral, and each coil of the tube has planar faces that are separated from the faces of the adjacent coil by a gap with a constant width, substantially lower than the thickness of said cross-section, with the spacing between two adjacent coils moreover being calibrated by means of spacers, which can consist, for example, of bosses formed in the wall of the tube.

This document also describes heat exchangers comprising a plurality of elements as above, which are arranged in different ways in the various embodiments mentioned.

An exchanger element thus designed allows for a very significant heat exchange between the hot gases that come into contact with the tubular element and the fluid to be heated that circulates inside it.

Indeed, when it passes through the gap between the coils, the flow of hot gases is in contact with a relatively extended surface of the wall of the exchanger element.

According to the embodiment shown in FIG. 22 of the aforementioned document WO 904/16272, to which reference can be made as necessary, the apparatus comprises two parallel bundles of tubes, a primary one 1 and a secondary one 1'.

These two bundles are arranged near one another, with their axes parallel, and are mounted securely inside a casing 8 (referred to as the "body" in the document).

The hot gases are supplied by an external apparatus 9 and penetrate, via a conduit 90 and a sleeve 80, the central portion of the main exchanger 1 (arrows $J_0$). The hot gases pas through the latter radially, from the inside to the outside (arrows $J_1$), then pass through the secondary exchanger, still radially, but this time from the outside to the inside (arrows $J_2$).

Finally, the cooled gases leave this double exchanger through a sleeve 81 (arrows $J_3$).

An improvement of this apparatus, intended in particular to improve the efficiency and compactness thereof, was the subject of WO 2004/016995, to which reference can also be made as necessary. It was derived from the observation made by the inventor that the energy to be recovered in the secondary exchanger is always lower than that captured by the primary exchanger.

Said improvement, which, according to the applicant, is the prior art closest to the present invention, relates to a condensation heat exchanger associated with a gas or fuel burner, which is composed of two bundles arranged near one another and mounted securely inside the a gas-tight casing, which two bundles communicate with one another by means of a so-called "transfer" collector, with means being provided in order to circulate a fluid to be heated, in particular cold water, first inside the tube(s) constituting said secondary bundle, then—via said transfer collector—inside the tube(s) constituting said primary bundle, wherein said casing surrounds the two bundles of tubes, while being slightly spaced apart from each of them, and said casing has a burned gas discharge sleeve positioned in the vicinity of said secondary bundle, which exchanger is thus arranged so that the hot gases generated by the burner pass radially, or approximately radially, by passing through the gaps separating their coils, first through said primary bundle, then said secondary bundle, and are then discharged from the exchanger through said sleeve.

It has essentially the following features:
the burner is housed coaxially inside the primary bundle;
the axial dimension of the secondary bundle is substantially smaller than that of the primary bundle, so as to provide an available space opposite an end portion of the primary bundle, in the extension of the secondary bundle of shorter length;
this available space is occupied by a chamber that communicates with the space inside the secondary bundle;
the sleeve is connected to the wall of the chamber so as to communicate with it, and is oriented transversely with respect to the axis of the secondary bundle, so that its bulk in the axial direction is contained in the chamber.

An objective of the invention is to propose an exchanger of the type mentioned above, of which the power is substantially further improved, without notably changing its bulk.

Another objective of the present invention is to propose an exchanger with an increased range of powers that is capable of operating under optimal conditions of efficiency and safety at any point in said range; by way of indication, this range may be from 25 to 500 kW, for example.

SUMMARY OF THE INVENTION

The condensation heat exchanger of the present invention is therefore, consistent with the teachings of document WO 2004/016995 cited above, an exchanger associated with a gas or fuel burner, that comprises two tubular bundles, one called a "primary" bundle, and the other called a "secondary" bundle, wherein each of said two bundles consists of a tube, or a group of tubes, with a generally cylindrical shape, which two bundles are arranged side-by-side, with their axes parallel, and are mounted securely inside a gas-tight casing, and communicate with one another, with means being provided for circulating a fluid to be heated, in particular cold water, between the tube(s) constituting the secondary bundle and the tube(s) constituting the primary bundle, which casing surrounds the two tubular bundles, and has a discharge sleeve for burned gases, wherein a cylindrical burner is housed coaxially inside the primary bundle, which exchanger is thus arranged so that the hot gases generated by the burner pass radially, or approximately radially, first through said primary bundle, from the inside to the outside, then said secondary bundle, this time from the outside to the inside, so as to then be discharged from the exchanger through said sleeve.

According to the invention, this exchanger is characterized by the fact that:
  it comprises a third primary tubular bundle, called an "additional" bundle, consisting of a tube, or a group of tubes, with a generally cylindrical shape, arranged next to the secondary bundle, with their axes parallel, and securely mounted inside said casing;
  a cylindrical burner is housed coaxially inside the additional primary bundle;
  this additional primary bundle communicates at least with the secondary bundle; means are provided for circulating the fluid to be heated, in particular cold water, between the tube(s) constituting the secondary bundle and the tube(s) constituting the additional primary bundle, which exchanger is thus arranged so that the hot gases generated by the burner pass radially, or approximately radially, first through said primary bundle, from the inside to the outside, then said secondary bundle, this time from the outside to the inside, so as to then be discharged from the exchanger through said sleeve;
  said casing is subdivided at the level of the secondary bundle by means of a partition that extends both inside and outside of said bundle, with the arrangement being such that a circumferential section of the secondary bundle only is capable of being contacted and passed through by the hot gasses generated by the burner of the primary bundle, while the remaining section is capable of being contacted and passed through only by the hot gases generated by the burner of the additional primary bundle.

With this arrangement, the secondary bundle can recover heat transported by the smoke from one and/or the other of the two burners, and the operation of the apparatus is not disturbed due to the presence of the partition associated with the secondary exchanger, which partition allows the operation with just one of the two burners or with both at the same time, at powers and starting/stopping times that may be very different for each burner.

Moreover, according to a certain number of possible advantageous, but non-limiting, features of the invention:
  the axes of the three bundles are located in the same plane and the secondary bundle is arranged between the two primary bundles;
  said partition extends diametrically with respect to the secondary bundle, perpendicularly to said plane;
  said plane is vertical;
  the three bundles are similar, with the same length and the same diameter;
  said casing includes a planar façade, called a front façade, perpendicular to the axes of the three bundles, to which said burners are attached;
  the exchanger comprises means for controlling the supply of each burner with fuel;
  said control means include a closing valve such as a pivoting flap capable of preventing or, on the contrary, allowing fuel to be supplied to the associated burner;
  said casing includes a planar façade, called a rear façade, perpendicular to the axes of the three bundles, which is passed through by an opening of the secondary bundle and is bordered by said sleeve;
  said partition has, on the side of said rear façade, a free edge that is slightly inserted into said opening and/or into said sleeve;
  said bundles are helical tube windings;
  the tubes constituting the helical windings have a planar and/or oval cross-section, of which the large axis is approximately perpendicular to the axis of the winding;
  the gap separating two coils of the winding has a width substantially smaller than that of the tube;
  each tubular winding constituting a bundle is constituted by a series of N identical modules placed end-to-end;
  the exchanger is equipped with a transfer system for fluid, in particular water, traveling through the exchanger, which includes:
  a) on a side of the casing:
    a first collection tank subdivided into two separate chambers by a partition, one called an upstream chamber, provided with an end piece capable of being connected to a conduit for supplying the fluid to be heated, and the other called a downstream chamber;
    a second collection tank subdivided into two separate chambers by a partition, one called an upstream chamber, and the other called a downstream chamber, provided with an end piece capable of being connected to a conduit for discharge of the heated fluid;
    wherein said upstream and downstream chambers are connected to one another by tubing;
  b) on the other side of the casing:
  a third collection tank formed by two chambers partially separated by an incomplete partition, one called an upstream chamber, and the other called a downstream chamber, which two chambers can communicate with one another through a passage with a limited cross-section located at the end of the partition;
  a fourth collection tank formed by two chambers partially separated by an incomplete partition, one called an upstream chamber, and the other called a downstream chamber, which two chambers can communicate with one another through a passage with a limited cross-section located at the end of the partition;
  wherein said upstream chambers are connected to one another by tubing;
  and:
  first, the N modules comprising the secondary winding are mounted in parallel, with their inlet connected to the upstream chamber of the first collection tank and their outlet connected to the upstream chamber of the fourth collection tank;
  second, a certain number Nb of modules comprising one of the two primary windings are mounted in parallel, with their inlet connected to the upstream chamber of the first collection tank and their outlet connected to the upstream chamber of the fourth collection tank, while the rest N−Nb of the modules comprising this primary winding are mounted in parallel, with their inlet connected to the downstream chamber of the fourth collection chamber and their outlet connected to the downstream chamber of the first collection tank;

third, a certain number Na of modules comprising the other primary winding are mounted in parallel, with their inlet connected to the upstream chamber of said second collection tank and their outlet connected to the upstream chamber of the third collection tank, while the rest N−Na of the modules comprising this primary winding are mounted in parallel, with their inlet connected to the downstream chamber of the third collection chamber and their outlet connected to the downstream chamber of the second collection tank.

Preferably:

said numbers Na and Nb are equal;

N is an even number and Na+Nb=N/2;

the tubing that connects the upstream chambers of the first and second collection tanks together and the tubing that connects the upstream chambers of the third and fourth collection tanks together are each provided with a valve capable of being closed, which makes it possible to isolate the circuit from one of the two primary exchangers when only the other primary exchanger is being operated.

The invention therefore first relates to a heat exchanger that comprises a pair of primary tubular bundles surrounding a fuel or gas burner, and a secondary tubular bundle on which condensation of the steam contained in the burned gases discharged from the primary bundles occurs, wherein the three bundles are mounted parallel, side-by-side inside a gas-tight casing, and communicate with one another, with means being provided in order to circulate the water to be heated, between the tubes forming the secondary bundle and the tubes forming the primary bundles, which exchanger is characterized in that the casing is subdivided at the level of the secondary bundle by a partition that extends both inside and outside said bundle, with the arrangement being such that only a circumferential section of the latter is capable of being contacted and traversed by the hot gases coming from one of the two primary bundles, and its remaining section being capable of being contacted and traversed only by the hot gases coming from the other primary bundle.

The invention also relates to a gas or fuel boiler including an exchanger having at least some of the features disclosed above, and which is provided with a pair of burners each equipped with means for controlling the fuel supply.

The invention also relates to a series of at least two boilers of this type, which are connected to the same heating circuit including channels supplying the water to be heated and sending out the hot water.

Other features and advantages of the invention will appear from the description and the appended drawings representing it, by way of non-limiting examples of possible embodiments.

BRIEF DESCRIPTION OF THE DRAWINGS

In these drawings:

FIG. 1 is a diagrammatic frontal view of a first embodiment of the invention, cut by the vertical plane referenced I-I in FIG. 2;

FIG. 2 is a diagrammatic side view of the apparatus of FIG. 1, cut by a vertical plane referenced II-II in FIG. 1;

FIGS. 3 and 4 are simplified perspective views on a smaller scale of the same exchanger, which views make it possible to distinguish, in particular, respectively, the front and rear façades, as well as the lateral collection tanks;

DETAILED DESCRIPTION

Figure 5:
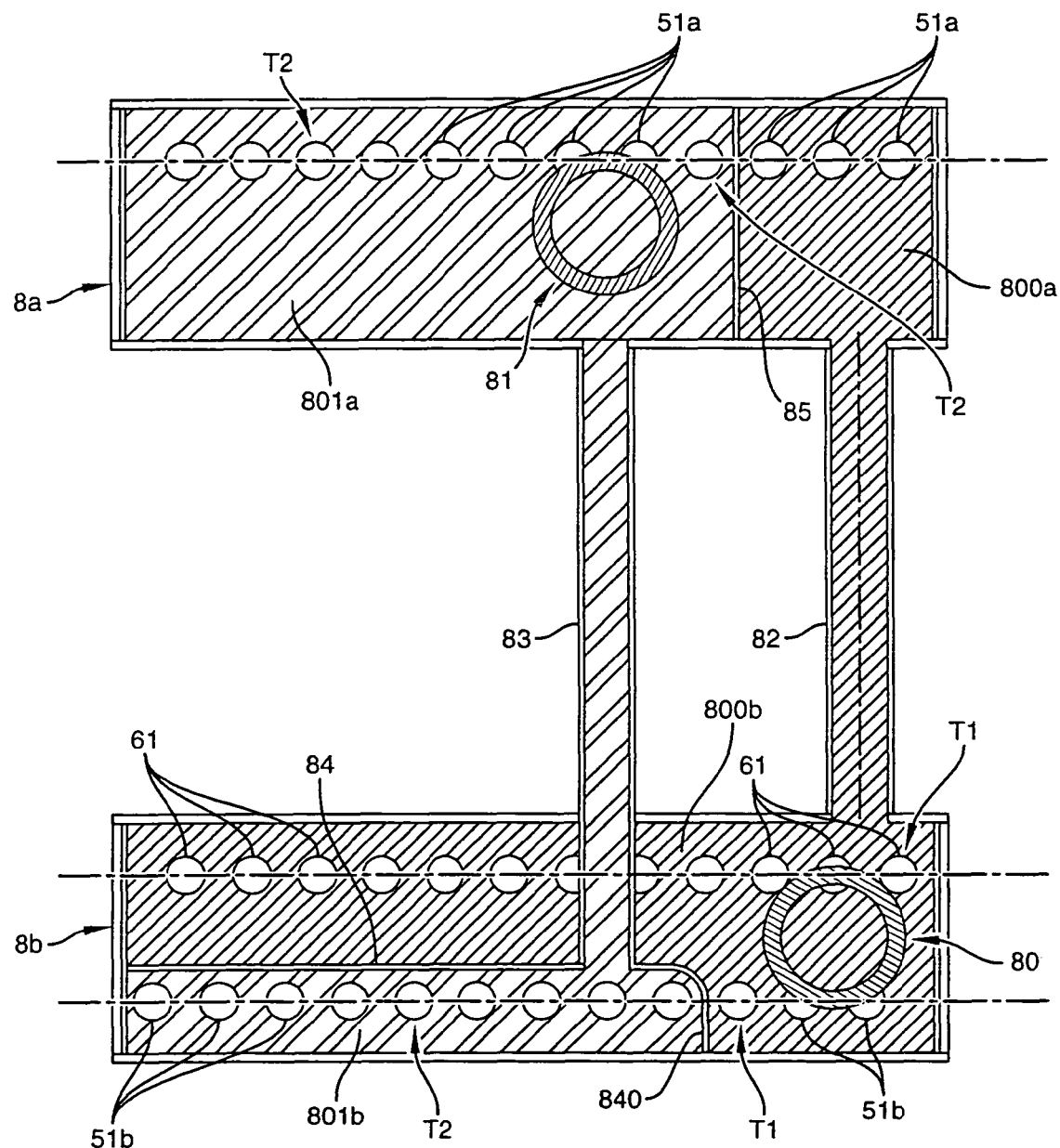
FIGS. 5 and 6 are diagrams showing the collectors and the hydraulic connections between the bundles, on each side of the exchanger.

The apparatus shown in FIGS. 1 to 4 includes a heat exchanger 1 comprising a thin-walled hollow body, or casing, referenced 10, for example made of stainless steel.

As shown in FIG. 2, from a side view, this body 10 has an oval shape of which the contour is formed in upper and lower semicircle portions, which are connected by two lateral rectilinear segments.

Figure 1:
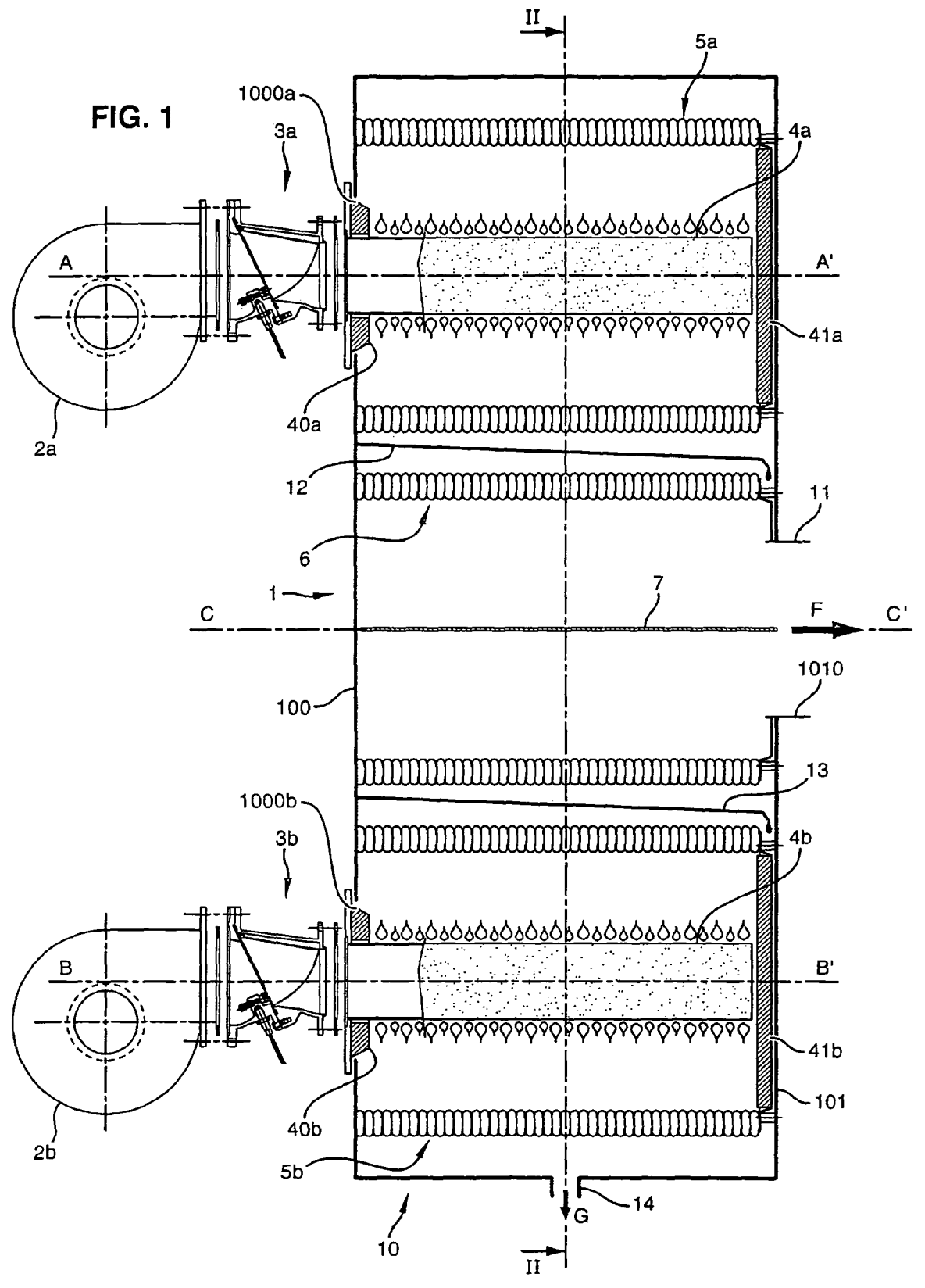

As shown in FIG. 1, it has façades 100 and 101 that are planar, parallel to one another, and perpendicular to the axis of the aforementioned semi-cylindrical portions.

In the remainder of this description, we will call the façade 100, located on the left-hand side of FIG. 1, the "front façade" and the opposite façade 101, facing right, the "rear façade".

These two façades are attached to the central tubular part of the casing in a gas-tight manner, for example by welding.

As shown in FIGS. 1 and 2, the base of the casing is equipped with an outlet 14 for condensate, of which the discharge is symbolized by the arrow G.

Inside this casing 1, three tubular cylindrical bundles with similar configurations and sizes, are mounted side-by-side, and referenced 5a, 6 and 5b.

In the embodiment of the invention described in FIGS. 1 to 6, the façades 100 and 101 are vertical, while the axes of said bundles 5a, 6 and 5b, respectively referenced A-A', C-C' and B-B', are horizontal and co-planar, located in the same median vertical plane, referenced Z in FIG. 2.

The bundle 6 is positioned between the upper 5a and lower 5b bundles, at a short distance therefrom.

Figure 14:
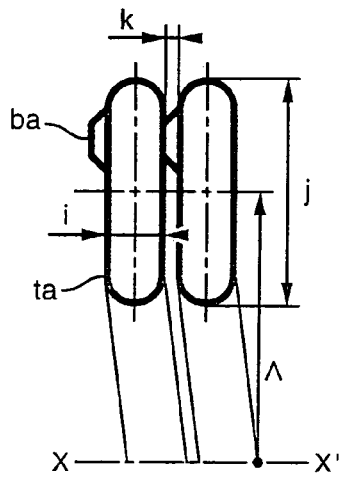
FIGS. 14 to 19 show various possible cross-section shapes of a tube with a helical winding constituting a tubular bundle.

According to this embodiment, each bundle is a helical winding of planar tubes, with an oval cross-section, of the type described in the international application WO 94/16272 mentioned above, and shown in FIG. 14, in which the axis of the spiral is referenced X-X'.

According to this figure, it is understood that the radial dimension j of the cross-section of the tube, referenced ta, is notably greater than its width i, which is itself substantially greater than the value k of the space between two adjacent coils, of which the gap is calibrated by bosses ba.

By way of indication, we have the following values:

j: between 20 and 50 mm;

i: between 6 and 8 mm;

k: between 0.7 and 1 mm;

Mean winding radius A between 90 and 130 mm;

Thickness of tube wall: between 0.4 and 1.5 mm;
Ratio i/k≦3.

These tubes have a wall made of a thermally conductive material; they are, for example, made of hydroformed stainless steel according to the teachings of WO 94/16272 or an aluminum alloy, or based on molded or hard-drawn aluminum, as indicated for example, in EP 1 752 718.

A module comprising a primary bundle 5*a*, 5*b* includes a main central tube portion 50*a*, 50*b* wound in a spiral with four coils, of which the end parts 51*a*-52*a*, and 51*b*-52*b*, respectively, are rectilinear and extend tangentially outwardly with respect to the casing of the spiral, with their free end portion having a cylindrical cross-section.

The modules comprising the secondary bundle 6 have an identical configuration, with a central portion 70 wound with four coils and straight end portions 61, 62.

This configuration, which is of course not obligatory, corresponds to that of the embodiment of the module shown in FIGS. 1, 2 and 24 of document WO 94/16272.

A similar module is represented in FIGS. 3A and 3B of document WO 2005/108875.

In the embodiment shown, each of the three bundles is constituted by a certain number of identical tubular modules, for example twelve modules (N=12). They are coaxially joined end-to-end and connected in parallel, as can be seen later in reference in particular to FIGS. 5 and 6.

Each bundle is thus a tubular winding of forty-eight coils (12×4), with a cylindrical shape, having, for example, a length on the order of 400 mm and an external diameter on the order of 250 mm.

The upper 5*a* and lower 5*b* bundles are primary exchanger elements, each provided internally with a burner 4*a* and 4*b*, respectively.

These are cylindrical burners of a known type, with a perforated or porous wall, having a diameter notably smaller than that of the winding, centered on the axis A-A' and C-C' respectively, and extending substantially over the entire length of the winding, i.e. from the front façade 100 to the rear façade 101. The holes of the burners, directed radially, enable a combustible gas mixture to pass through, for example air+butane or air+fuel, and the external surface of the tubular wall constitutes the combustion surface.

Their diameter is for example on the order of 70 mm.

The burners 4*a*, 4*b* are attached, for example by bolting, to the front façade 100 and pass through ad hoc openings 1000*a* and 1000*b*, respectively, provided in the latter; these openings are bordered by an annular part 40*a*, 40*b* made of a heat-resistant and thermally insulating material; at the opposite end, a disk 41*a*, 41*b* made of a similar material, of which the diameter corresponds to that of the bundle, is attached to the internal face of the rear façade 101. These elements are intended to protect the wall of the casing 10 at this level from the significant heat generated by the combustion.

Each burner is equipped with a suitable ignition device, for example an electrode, located very near the combustion surface. In this case, it is a known device that has not been shown in the drawings, for the sake of simplicity.

Suitable assembly components make it possible to properly immobilize each burner, as well as the primary bundle surrounding it, inside the casing 10.

In the embodiment shown, the combustible gas mixture is brought to each burner 4*a*, 4*b* by means of a fan 2*a*, 2*b* of a known type, with a variable flow rate, which is also part of the apparatus.

However, it is not beyond the scope of the invention to substitute this fan with a sleeve supplying the mixture, by separate means (of a known type).

The combustible mixture—butane and air, for example—is sent to each burner by way of control means 3*a* and 3*b*, respectively.

Figure 7:
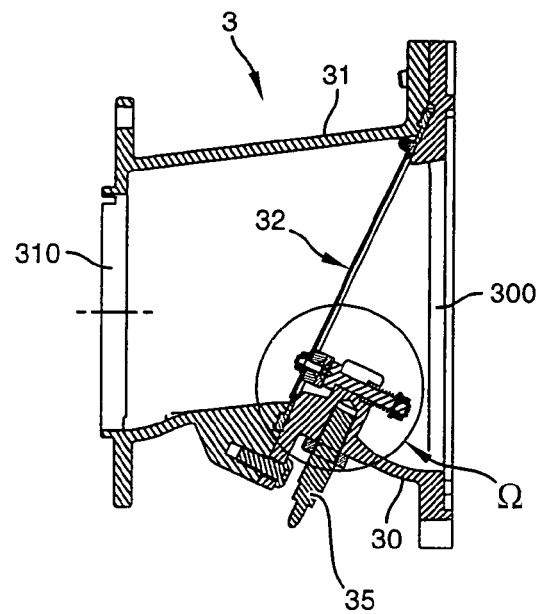
FIGS. 7 and 8 show, in a cross-section, a burner supply control device, provided with a pivoting closing valve, respectively in the closed state and in the open state.
Figure 8:
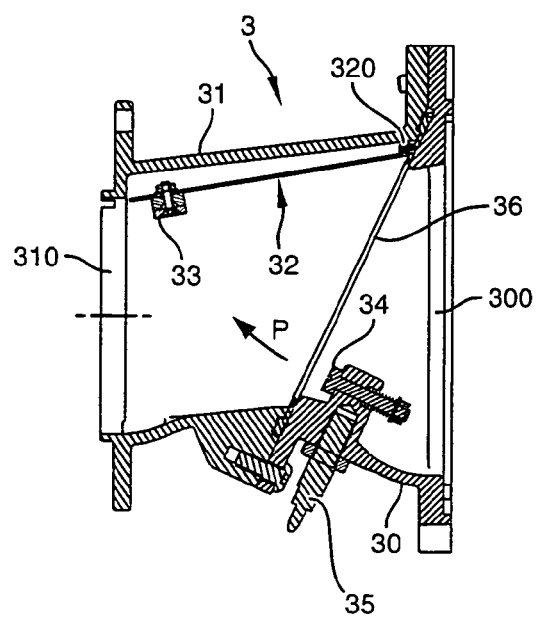
Figure 9:
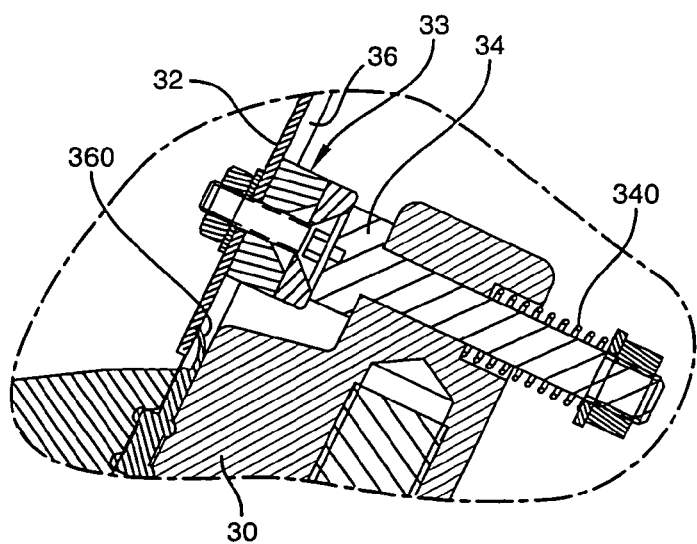
FIG. 9 is a detail on a larger scale of the area referenced Ω in FIG. 7.

As shown in FIGS. 7 to 9, these means—which correspond to reference 3—include a base body 30 having an inlet opening 300 on which a conduit 31 is attached, having an outlet opening 310. A closing valve 32 in the form of a pivoting flap is placed at the inlet of this conduit, and has a rotational axis of 320, capable of preventing or, on the contrary, allowing fuel to be supplied to the associated burner 4.

At the outlet of each fan 2, an assembly plate enabling it to be attached to the body 30 is provided.

The conduit 31 is attached, also by means of an assembly plate, to the façade 100, in the alignment of the internal tubular space of the burner 4.

This arrangement makes it possible to easily disassemble the burners, in particular for the purpose of cleaning, maintenance and servicing of the exchangers.

In FIG. 8, the arrow P symbolizes the opening of the valve 32 of which the upward pivoting reveals a through-window 36.

The passage of the mixture occurs from right to left, in reference to FIG. 8, when the valve is open.

At the base of the valve 32, a magnet 33 is mounted, and is capable of cooperating, in a closed position, with a magnet 34 of opposite polarity (or an element made of a ferromagnetic material) mounted in the stationary body 30. The magnet 34 has a rod urged by a return spring 340 so as to normally press on the body 30 (see FIG. 9).

When the valve is closed, it seals off the opening 36, owing to the mutual attraction of the two magnets 33-34, which come into contact, and the presence of a flexible peripheral sealing lip 360.

In the support 30, in the vicinity of the magnet 34, an electromagnetic field sensor of a known type is provided, which is capable of detecting whether or not the magnets are in mutual contact, and thus, correspondingly, whether the valve is open or closed. When the spring 340 is present, the magnet 34 is capable of moving over a certain course and can briefly accompany the magnet 33 in the direction of opening of the valve, before the two magnets separate. With this arrangement, the risk of false detection of an opening of the valve 32 by the sensor 35 is avoided.

The valve is opened automatically under the pressure of the fluid distributed by the fan 2. The magnets are calibrated so that the opening occurs above a certain pressure, and the degree of opening of the valve (which naturally tends to close due to gravity) is proportional to the flow rate of the mixture supplied by the fan and passing through the opening 300.

When the fan stops, the valve closes automatically and occupies a securely sealed position, owing to the cooperation of the two magnets. The valve consequently has an anti-return function, which prevents any reflux of gas in the opposite direction (toward the fan).

The sensors 35 (each associated with a burner) are connected to an electronic control unit making it possible to manage and control the operation of the apparatus, taking into account operating instructions and certain parameters, such as, in particular, the temperature and the flow rate that are measured at certain points in the central heating circuit. This circuit controls the starting and stopping of each fan and the associated burners, and the power implemented by each burner, which is dependent on the flow rate of the fan(s).

These sensors make it possible to detect any abnormal functioning, in particular the undesired opening of a valve when the associated burner is not operating.

In this case, the control circuit can transmit an ad hoc alarm signal and/or stop the boiler.

The central bundle 6 is similar to the primary top and bottom bundles 5a, 5b; it is a secondary bundle, without a central burner.

The rectilinear end portions 51a and 52a of the modules of the upper primary bundle 5a pass laterally through the wall of the casing 10 and are connected on each side of said casing to a collector, 8a and 9a, respectively.

The rectilinear end portions 61 and 51b, and 62 and 52b, of the modules of the central bundle 6 and the lower primary bundle 5b pass laterally through the wall of the casing 10 and are connected on each side of said casing to the same collector, 8b and 9b, respectively.

Below the bundles 5a and 6, plates 12, 13 are provided, which have an approximate gutter shape with a V cross-section (very wide angle) slightly inclined with respect to the horizontal, running from the front facade 100 almost to the rear façade 101 of the casing 10.

Their function is to collect and channel the condensate forming on the tubes while preventing it from falling onto the lower bundles; this condensate is channeled to the rear end of the bundles in order to flow toward the base of the casing and be discharged through the outlet 14.

In the rear wall 101 of the casing, a circular opening 1010 is provided, with an axis C-C', having a diameter smaller than the internal diameter of the bundle 6, provided with a collar 11 constituting the smoke exhaust sleeve. This sleeve can be connected to a flue.

The internal space of the casing 10 is subdivided by a planar horizontal partition passing through the axis C-C', having a main central portion 7 that is located inside the bundle 6 and two lateral portions 70 that are located outside it. The portion 7 has a width substantially equal to the internal diameter of the winding so that it is diametrically contained, without notable clearance, inside the bundle 6.

The lateral portions 70 are inserted between the winding and a lateral wall of the casing, also without clearance.

The partition 7-70, for example made of stainless steel, extends over the entire length of the bundle 6, between the walls 100 and 101. The portion 7 has a rear edge with a profile suitable for slightly penetrating the sleeve 11.

Suitable connection means, not shown, make it possible to ensure the immobilization of the partition 7-70 in the position indicated.

In reference to the diagrams of figures and 6, we will now explain how the various modules of the bundles 5a, 6 and 5b are connected to the collectors 8a-8b and 9a-9b, and how the latter are arranged. Each tubular winding element (or module) is held inside the casing due to the engagement of its cylindrical opening portions in the appropriate circular holes provided in the lateral vertical planar walls of the casing, and penetrating into the collectors.

Suitable sealing means are provided at this level.

Figure 6:
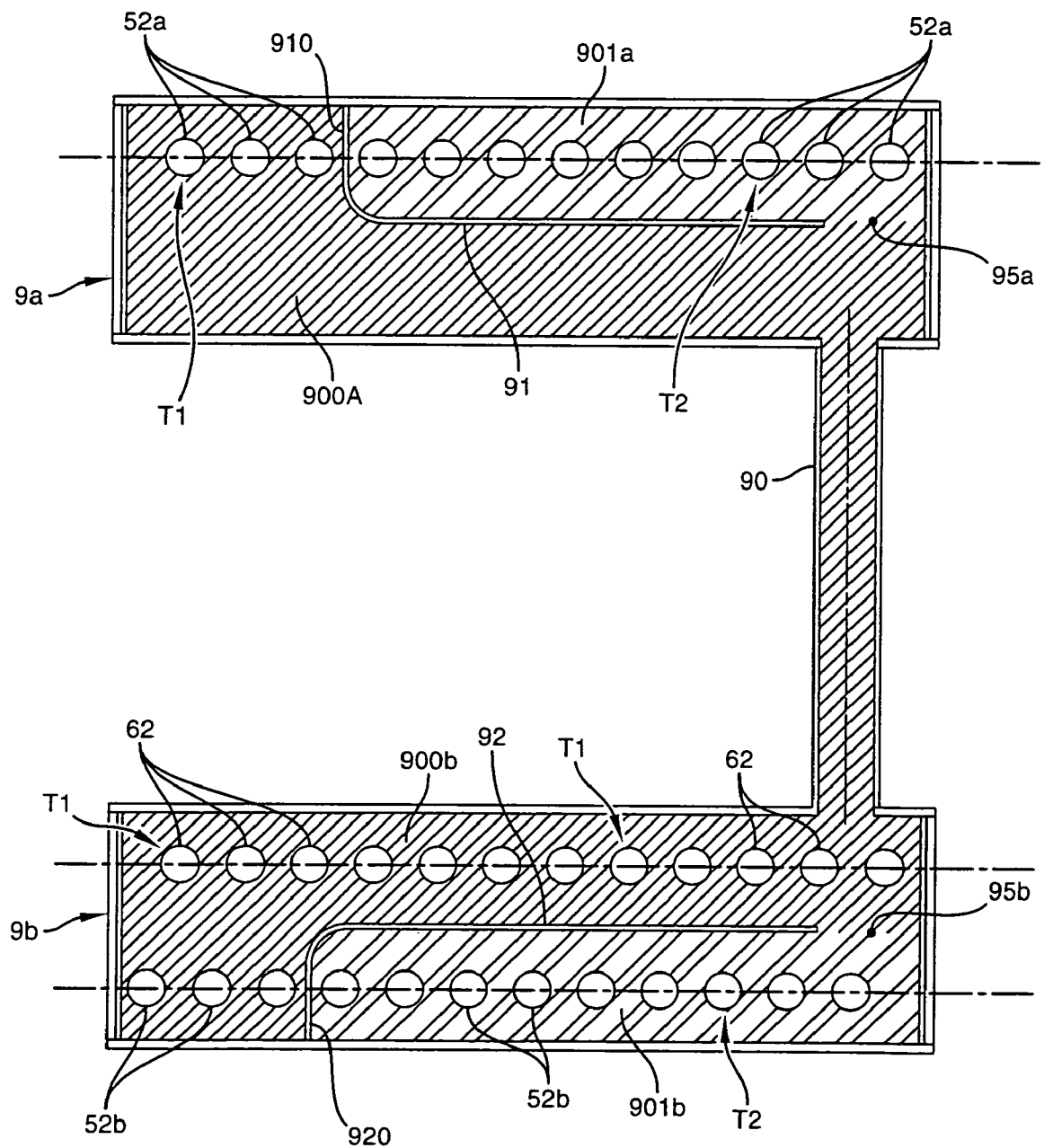

The front façade 100 of the apparatus is facing left in FIG. 5 and right in FIG. 6.

The upper lateral collectors 8a, 8b are tanks with an approximate rectangular box shape, to which the end portions 51a, 52a of the modules constituting the primary bundle 5a are respectively connected.

In reference to FIG. 5, it can be seen that the tank 8a—or "second" tank—is subdivided internally, in a leak-proof manner, by a vertical partition 85. This is positioned so that three of the modules connect to the tank 8a on the rear side of said partition, in a so-called "upstream" chamber 800a (Na=3).

The nine (N−Na=9) remaining modules open in front of the partition 85, into a so-called "downstream" chamber 801a.

The latter is provided with an end piece 81 for connection to an outgoing hot water conduit.

In reference to FIG. 6, it can be seen that the tank 9a—or "third" tank—is subdivided internally, but incompletely, by a horizontal partition 91, of which the rear edge is rounded and forms a portion 910 that rises to join the upper horizontal wall of said tank.

The three aforementioned modules, which (on the other side) connect to the tank 8a on the rear side of the partition 85, open behind the portion 910, into a so-called "upstream" chamber 900a, with the nine other modules opening in front of this portion, above the partition 91, into a so-called "downstream" chamber 901a.

The two chambers 900a and 901a communicate through a passage area 95a located opposite the front free edge of the partition 91.

The lower lateral collectors 8b, 9b are tanks also having an approximate rectangular box shape, to which the end portions 61, 62 of the modules constituting the secondary bundle 6, and 51b, 52b of the modules constituting the primary bundle 5b are simultaneously respectively connected.

In reference to FIG. 5, it can be seen that the tank 8b—or "first" tank—is subdivided internally, by a horizontal partition 84, of which the rear edge is rounded and forms a portion 840 that descends to join the lower horizontal wall of said tank.

It subdivides the internal space of the tank 8b into a main chamber, called an "upstream" chamber and a smaller chamber 801b, called a "downstream" chamber.

All of the N (twelve) modules comprising the secondary bundle 6 as well as the three rear modules of the primary bundle 5b (Nb=3) into chamber 800b. The nine other modules (N−Nb) of the latter open into the other chamber 801b.

The upstream chamber 800b is provided with an end piece 80 for connection to a conduit supplying the water to be heated.

In reference to FIG. 6, it can be seen that the tank 9b—or the "fourth" tank—is subdivided internally, but incompletely, by a horizontal partition 92 of which the rear edge is rounded and forms a portion 920 that descends to join the lower horizontal wall of said tank.

The three aforementioned modules of the primary bundle 5b, which (on the other side) connect to the chamber 800b, open behind the portion 920, into a so-called "upstream" chamber 900a, with the nine other modules opening in front of this portion, below the partition 91, into a so-called "downstream" chamber 901b.

The twelve modules of the secondary bundle 6 open into the upstream chamber 900b.

The two chambers 900b and 901b communicate through a passage area 95b located opposite the front free edge of the partition 92.

In FIG. 6, it may be noted that the configuration of the partitioning of chambers 9a and 9b is symmetrical with respect to a horizontal plane.

The upstream chambers 800b and 800a of the first and second tanks are connected by vertical tubing 82.

Similarly, their downstream chambers 801a and 801b are connected by vertical tubing 83.

On the other side, the upstream chambers 900a and 900b of the third and fourth tanks are connected by vertical tubing 90. This opens at its top and bottom ends in front of the tanks, substantially opposite the passage areas 95a and 95b.

The operation of this apparatus will now be described in reference to FIGS. 1 to 9.

The apparatus is, for example, a collective boiler connected to a water circuit of the central heating system of a building.

The cold water arrives in the first collection tank 8b and penetrates the upstream chamber 800b thereof, via the tubular connection 80.

It is assumed that the two burners 4a, 4b are on.

The cold water, in a first passage, first irrigates the twelve modules of the secondary bundle 6, penetrating them through their end portion 61, the three rear modules of the lower primary bundle 5, penetrating them through their end portion 51b, as well as the three rear modules of the upper primary bundle 5a, penetrating them through their end portion 51a, via the tubing 82 and the upstream chamber 800a of the second tank 8a.

This irrigation mode can be understood by looking at FIG. 5.

After having passed through each module, the water that— as will be seen later—has partially been heated, leaves on the other side of the apparatus into tanks 9a and 9b.

More specifically, it leaves the three rear modules of the upper primary bundle 5a through their end portion 52a inside the upstream chamber 900a of the third tank 9a.

In the fourth tank 9b, it is inside upstream chamber 900b, simultaneously outside of the three rear modules of the lower primary bundle 5a through their end portion 52b, and outside of the assembly of modules comprising the secondary central bundle 6 through their end portion 62.

At the level of the upper tank 9a, the water that has left the tube portions 52a in the upstream chamber 900a bypasses the partition 91 and penetrates, through the passage 95a, the downstream chamber 901a.

At the level of the lower tank 9b, the water that has left the tube portions 52b and 62 in the upstream chamber 900b is divided into two flows, one of which bypasses the partition 92 and penetrates, through the passage 95b, the downstream chamber 901b, while the other rises the tubing 90 to also join the downstream chamber 901a of the upper tank via the passage 95a.

This division occurs naturally under the effect of the distribution of pressures in the chamber constituted by the two tanks 9a-9b and the tubing 90 that connects them. It is explained by the fact that the two downstream chambers 901a and 901b have the same number of inlet tubes 52a and 52b, respectively (i.e. nine tubes to be irrigated).

The chamber 901 therefore drains, in addition to the flow provided by the three upper tubes 52a, a flow corresponding to six other tubes, which can only be tubes of the lower tank 62 and/or 52b. The nine other tubes 62 and/or 52b of the lower tank supply the nine remaining tubes 52b located in the downstream chamber 901b.

This arrangement therefore makes it possible to balance the flows by reducing head losses.

This mode of irrigation and routing of the liquid can be understood by looking at FIG. 6.

In turn, the nine front modules of the two primary bundles 5a and 5b are therefore passed through by the water that, as will be seen below, has already been preheated.

It leaves hot, from the other side, through the portions 51a in the downstream chamber 801a of the upper tank 8a and, through the portions 51b in the downstream chamber 801b of the lower tank 8b.

The hot water leaves the apparatus through the outlet end piece 81, directly in chamber 801a, and via the tubing 83 in chamber 801b.

In FIGS. 5 and 6, the tubes referenced T1 correspond to the first preheating passage, while those referenced T2 correspond to the second passage, for the actual heating.

It may be observed that, for the purpose of optimizing the reduction and balance of head losses in the various collection tanks, the number and availability of the tubes as well as the configuration of the partitions are chosen so as to substantially form a so-called "Tickelman loop" network.

Such a network, which allows for an optimal flow, is thus designed so that when a point A located in an upstream conduit, with a passage section S, is connected to a point B located in a downstream conduit with the same passage section S, by means of n basic conduits connected in parallel, said basic conduits all have the same passage section $s=S/n$ and the various paths covered have the same length and encounter the same "accidents" (same number of right-angle turns, for example).

We will now explain how the two-phase heating of the water passing through the exchanger works.

With fans 2a and 2b on, a combustible gas mixture is provided inside each tubular burner 4a, 4b, via valves 3a, 3b, which open automatically, then remain open, under the effect of the pressure of the mixture. This mixture leaves the wall of the burners through small openings that pass through the wall. As the burners are ignited, a combustion is produced, which generates flames over their entire surface (see FIGS. 1 and 2).

At the same time, the water to be heated has been put in circulation, by means of a pump provided in the circuit.

The cold water to be heated, as explained above, circulates first, in parallel, through the assembly of modules comprising the secondary bundle 6 as well as through the three rear modules of the primary bundles 5a and 5b (i.e. 18 modules in all).

At the end of this first passage, it circulates, still in parallel, through the nine front modules of the primary bundles 5a and 5b (i.e. also 18 modules in all).

The burning gases generated in the internal space of each primary bundle are discharged from the bundle. They pass radially through the gaps separating the planar tubes that comprise it, producing, by each thermal exchange, an increased heating of the water passing through them internally.

At the outlet of the primary bundle, the burned gases are considerably cooled after this thermal exchange.

They are nevertheless at a temperature clearly higher than that of the water (at room temperature) that reaches the apparatus.

As an indication, their temperature is on the order of 100 to 150° C.

The hot gases coming from the lower primary bundle 5b are channeled upward, following the internal path of the casing. They pass over the sides of the plate 13, and traverse the lower half of the secondary bundle 6, which is located under the partition 7-70, still passing through the gaps between the coils, but this time from the outside to the inside.

During this passage, there is at least a partial condensation of the steam present in the burned gases, due to the fact that the walls of the tubes of the secondary bundle—passed through by the cold or lukewarm water are at a temperature below the dew point of the combustion products. In addition to the normal transfer of heat energy, by thermal conduction, there is an additional transfer of heat energy resulting from the transmission of latent vaporization heat related to condensation, which is an exothermic phase change.

The hot gases coming from the upper primary bundle 5a have a similar, but descending, trajectory. They are channeled downward, following the internal wall of the casing. They pass over the sides of the plate 12, and traverse the upper half of the secondary bundle 6, which is located above the partition 7-70, still from the outside to the inside, passing through the gaps between the coils.

We thus obtain a double preheating of the water circulating in the secondary bundle before it reaches the primary bundle.

A half of the secondary bundle is therefore assigned to a complete primary bundle, so that the rule disclosed in the preamble of the present description, namely the fact that the energy to be recovered in the secondary exchanger is always lower than that captured in the primary exchanger, is also followed here.

The burned, and notably cooled, gases are located in the space inside the secondary exchanger 6, on each side of the central partition 7, then are discharged from the apparatus through the discharge sleeve 11.

Some of the cold water reaching the apparatus is also preheated, but at a temperature clearly above that of the water passing through the primary bundle 6. It is the water circulating in the three rear modules of each primary bundle 5a, 5b, which are exposed to the burning gases generated by the burners.

The front nine modules of each primary bundle 5a, 5b provide the definitive heating.

It is possible to modulate the power generated by this boiler over a very wide range by adjusting the power implemented for each burner. For the same overall power developed by the burners, this power can be distributed differently among said burners. The distribution can in particular be different depending on whether the water is to be provided at a high temperature, but at low flow rate, or at a moderate temperature but at a high flow rate, which two situations may require the same power.

This makes it possible, by an adapted management of the control unit, to constantly work with optimal efficiency.

The apparatus works correctly even if only one of the two burners is on, even if they are turned on at different times, and more importantly, even if the powers implemented in the two burners are very different.

This is made possible by the presence of the partition 7-70 that isolates one of the two halves of the secondary bundle from the other. Without it, there could be a harmful interaction of gas pressures around the secondary bundle, which could adversely affect the operation of each burner.

The anti-return function of the valves 3a and 3b also contributes to the successful operation, because it prevents any disturbance related to an undesired gas reflux outside of a burner when it is not on.

When a single burner is on, only the half of the secondary bundle 6 (facing said burner) is naturally exposed to the hot gases.

Figure 10:
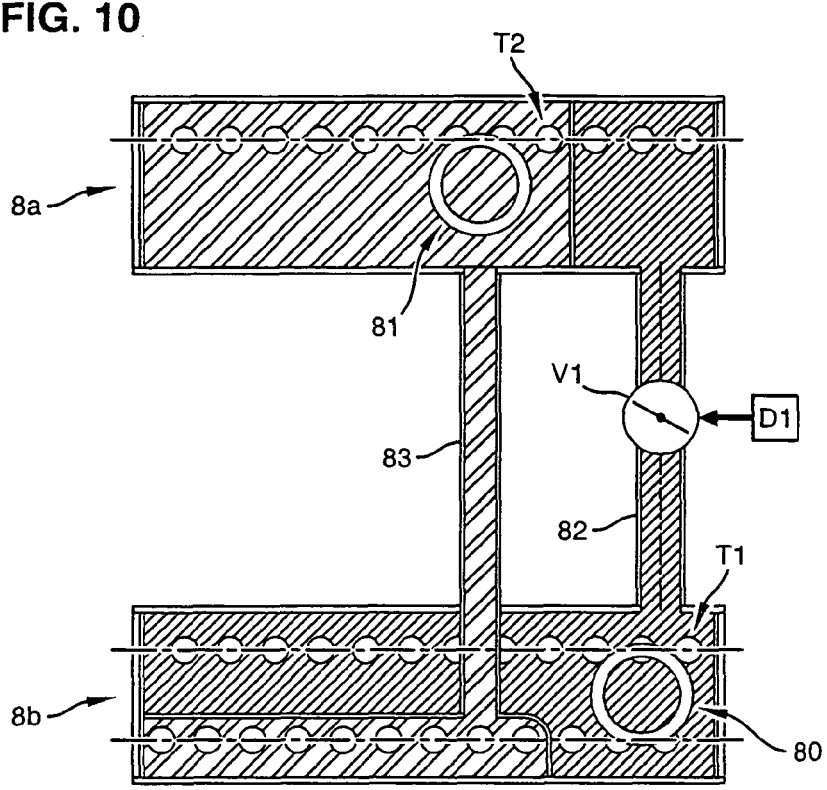
FIGS. 10 and 11 are diagrams similar to those of FIGS. 5 and 6, showing an alternative provided with valves for isolating a primary bundle.
Figure 11:
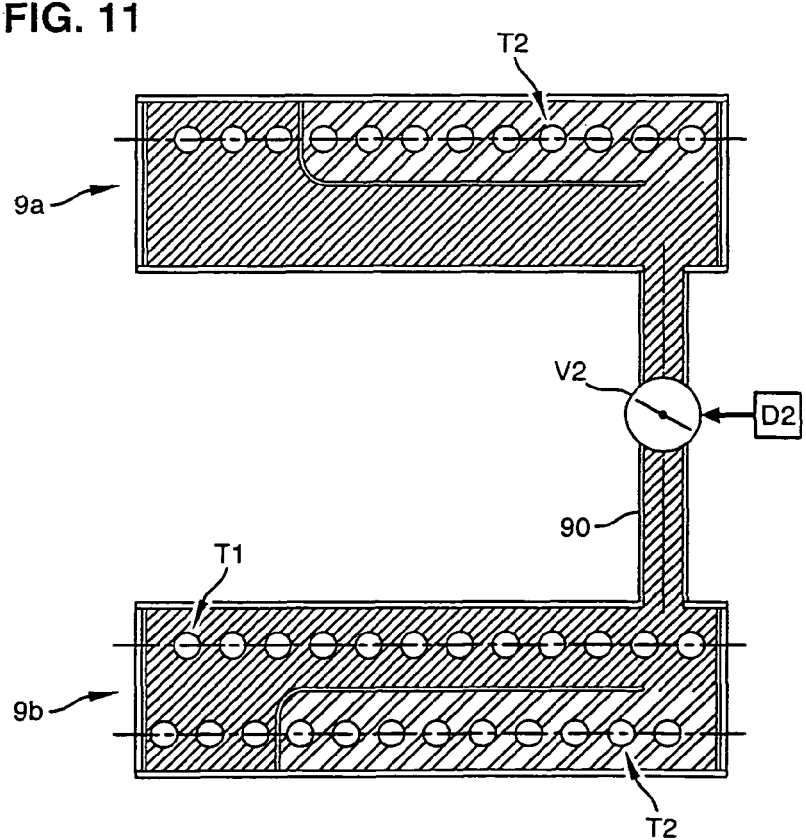

In the alternative shown in FIGS. 10 and 11, it is possible to isolate the primary bundle 5a from the rest of the apparatus, in order to prevent the water from circulating in the latter when only the other primary bundle 5b is on.

Thus, the tubings 82 and 90 mentioned above are each equipped with a valve V1 and V2, respectively, actuated by a control device D1 and D2, respectively, so as to be capable of being opened or closed. They are, for example, solenoid valves.

When V1 and V2 are open, the apparatus works as described.

When they are closed, only the lower burner 4b is on, and the water circuit is as follows.

The water that reaches the tank 8b through the end piece 80 irrigates, in a first passage, the three rear modules of the primary bundle 5b and all of the modules of the secondary bundle 6 (of which only the bottom half is heated), then, in a second passage, the nine remaining tubes of the primary bundle 5b, and is finally discharged via the tubing 83 through the outlet end piece 81.

Figure 12:
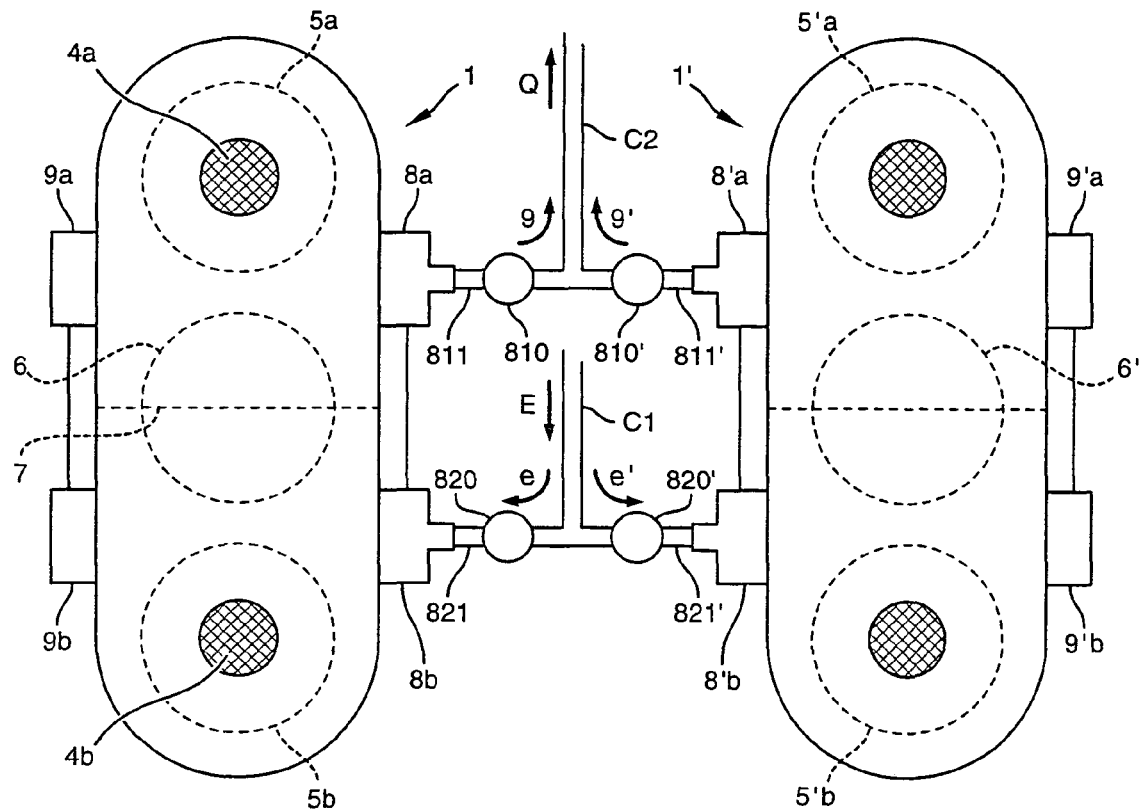
FIG. 12 diagrammatically shows a series of two boilers according to the invention.

FIG. 12 diagrammatically shows a series assembly of two similar boilers 1, 1' as described above.

In one of them 1', the lateral positioning of the collection tanks, referenced 8'a-8'b and 9'a-9'b is inverted with respect to the collection tanks referenced 8a-8b and 9a-9b of the other 1 (left/right inversion).

The two apparatuses are placed side-by-side so that their collection tank pairs 8a-8b and 8'a-8'b are opposite one another.

The water to be heated arrives through a channel C1 (arrow E), which is connected by a tee, by means of conduits 821, 821', to each of the inlet end pieces 8b and 8'b, respectively.

The hot water leaves through a channel C2 (arrow Q), which is connected by a tee, by means of conduits 811, 811', to each of the outlet end pieces 8a and 8'a, respectively.

The incoming cold water flow E is divided into two secondary flows e and e' each supplying an apparatus 1 and 1', respectively.

The secondary flows q and q' of hot water leaving the apparatuses rejoin to form a single flow Q.

The conduits 821, 821' and 811, 811' are advantageously equipped with a valve 820, 820' and 810, 810' making it possible to isolate one or the other of the two apparatuses if it is not to be turned on.

This series assembly makes it possible to double the total power of the installation, while maintaining a beneficial compactness.

Such an assembly can of course be applied to more than two apparatuses.

In the embodiment of an exchanger described above, in reference in particular to FIGS. 1 and 2, the parallel axes A-A', C-C' and B-B' of the three bundles are co-planar, and their common plane Z is vertical.

This arrangement is not obligatory.

If said axes are co-planar, their common plane is not necessarily vertical. It can in particular be horizontal; in this case, the primary bundles are arranged on each side of the secondary bundle, and it is the partition 7-70 that is vertical.

However, said axes are not necessarily co-planar.

Figure 13:
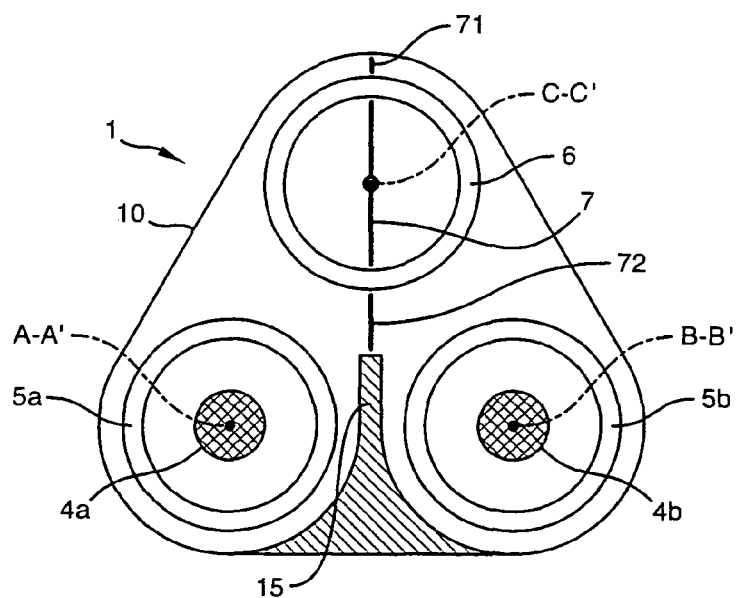
FIG. 13 is a simplified side view of a possible alternative of the exchanger.

Thus, according to the embodiment shown in FIG. 13, the apparatus 1 has three bundles distributed according to a triangle.

The primary bundles 5a and 5b are arranged side-by-side, with their axes A-A' and B-B' in a common horizontal plane.

The secondary bundle 6 is positioned above the pair of primary bundles so that its axis C-C' is located in a median vertical plane passing between the two primary bundles.

Between these two primary bundles, inside the casing 10, a deflector 15 with lateral walls in the form of an arc of cylinder is mounted, which walls are capable of channeling the burning gases generated by the primary bundles upward, toward a half of the space occupied by the secondary bundle. According to the invention, this space is subdivided into two parts by a partition 7, 71-72, which in this case is vertical.

In reference to FIG. 13, only the left half of the secondary bundle is heated by the gases coming from the primary bundle located to the left; similarly, only the right half of the secondary bundle is heated by the gases coming from the primary bundle located to the right.

FIGS. 15 to 19 show that, for a bundle consisting of a helical tubular winding, different tube cross-sections can be used.

Figure 15:
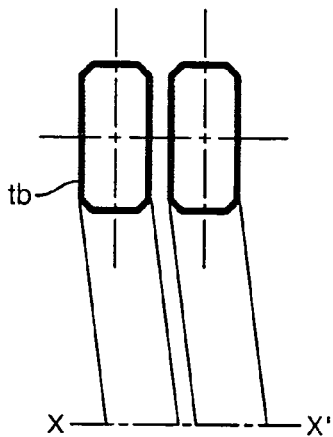
Figure 16:
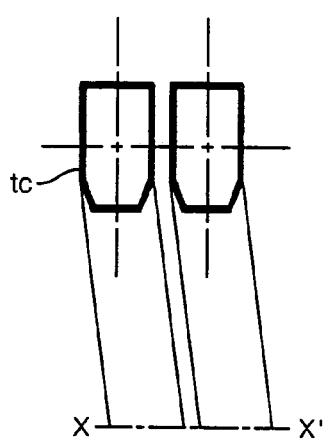

The tube tb of FIG. 15 has an essentially rectangular cross-section, with rounded angles (not sharp).

A configuration of this type is described, for example, in document EP 1 039 246.

The tube tc of FIG. 15 has a cross-section composed of an essentially rectangular external portion, and an essentially trapezoidal internal portion, i.e. facing the X-X' axis of the winding. A configuration of this type is described, for example, in document EP 0 745 813.

Figure 17:
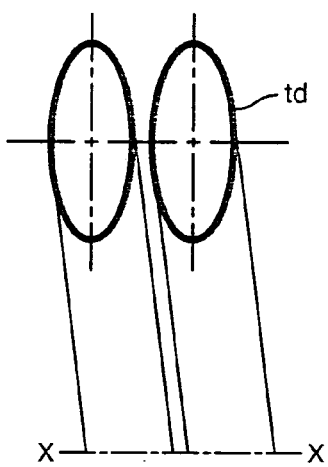

The tube td of FIG. 17 has an oval cross-section of the type described in document EP 1 752 718; this type of tube can also be provided with blades, as described for example in WO 2004/090434. The lateral portions of the cross-section can be more or less curved or planar (see also EP 1 281 919).

Figure 18:
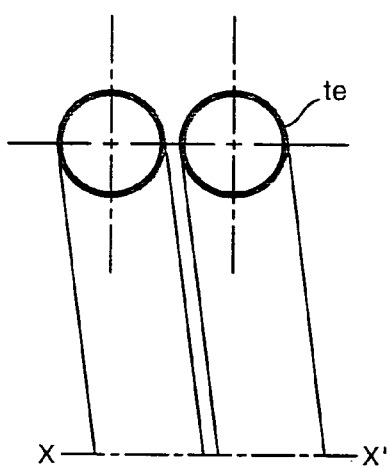

The tube te of FIG. 18 has a circular cross-section.

Figure 19:
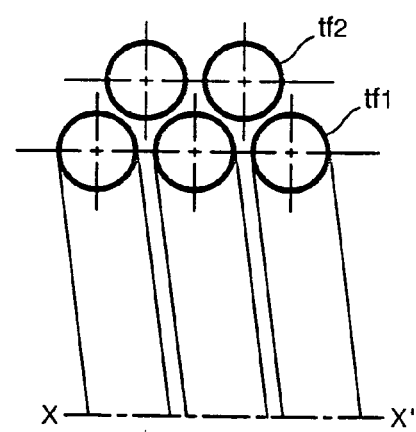

The winding shown in FIG. 19 is a double winding, including two similar concentric tube, one internal $tf_1$, the other external $tf_2$, with a larger winding diameter. An arrangement of this type is described, for example, in EP 1 703 227. A configuration with three concentric windings, also applicable to the present invention, is described in EP 1 279 903.

Various other cross-section shapes can naturally be provided, such as, for example, a "water drop" shape, described in document DE 100 02 894 A1, or a rectangular shape with an internal semi-cylindrical edge, as in document DE 20 2005 011 633 U1.

Advantageously, regardless of the shape of the cross-section of the tube (or tubes) of the winding, the value of the gap between coils is relatively low, calibrated and advantageously kept constant by means of suitable spacers; the latter can form an integral part of the tubes (in particular in the form of bosses or teeth) and/or be separate components, of the "comb" type, for example.

The bundles are not necessarily helical windings. They ca, for example, consist of a layer of rectilinear and parallel tubes, forming the generatrices of a cylindrical casing (virtual). These tubes are connected at their ends to collection tanks and distributors, and the water can circulate therein by a series and/or parallel connection.

Figure 20:
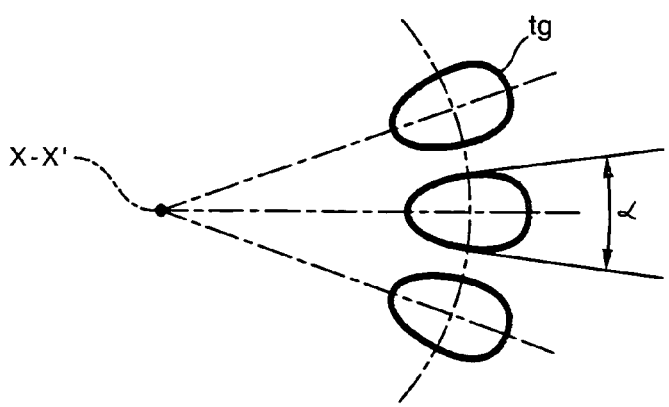
FIG. 20 shows an alternative in which the cylindrical bundle is formed by parallel tubes arranged according to the generatrices of the cylinder (therefore parallel to the axis of the bundle).

As shown in FIG. 20, these tubes tg advantageously have a cross-section with planar radial lateral faces, which converge toward the axis X-X' of the bundle according to an acute angle α. An arrangement of this type is, for example, the subject matter of document FR 2 476 808.

The three bundles provided in the exchanger of the invention do not necessarily have identical shapes and/or sizes, and are not necessarily of the same type; a "mix" of different bundles is possible.

An apparatus according to the invention is compact and lightweight, while being extremely efficient.

While it is remarkably suited for industrial or household use, for heating water, it can be applied in various other fields, in particular in industry, for heating various fluids.

The invention claimed is:

1. Condensation heat exchanger, associated with a gas or fuel burner, which comprises two tubular bundles, one called a "primary" bundle, and the other called a "secondary" bundle, wherein each of said two bundles consists of a tube, or a group of tubes, with a generally cylindrical shape, which two bundles are arranged side-by-side, with their axes (A-A', C-C') parallel, and are mounted securely inside a gas-tight casing, and communicate with one another, with means being provided for circulating a fluid to be heated, in particular cold water, between the tube(s) constituting the secondary bundle and the tube(s) constituting the primary bundle, which casing surrounds the two tubular bundles, and has a discharge sleeve for burned gases, wherein a cylindrical burner is housed coaxially inside the primary bundle, which exchanger is thus arranged so that the hot gases generated by the burner pass radially, or approximately radially, first through said primary bundle, from the inside to the outside, then said secondary bundle, this time from the outside to the inside, so as to then be discharged from the exchanger through said sleeve, characterized in that:

it comprises a third primary tubular bundle, called an "additional" bundle, consisting of a tube, or a group of tubes, with a generally cylindrical shape, arranged next to the secondary bundle, with their axes parallel (B-B', C-C'), and securely mounted inside said casing;

a cylindrical burner is housed coaxially inside the additional primary bundle;

this additional primary bundle communicates at least with the secondary bundle, means are provided for circulating the fluid to be heated, in particular cold water, between the tube(s) constituting the secondary bundle and the tube(s) constituting the additional primary bundle, which exchanger is thus arranged so that the hot gases generated by the burner pass radially, or approximately radially, first through said primary bundle, from the inside to the outside, then said secondary bundle, this time from the outside to the inside, so as to then be discharged from the exchanger through said sleeve;

said casing is subdivided at the level of the secondary bundle by means of a partition that extends both inside and outside of said bundle, with the arrangement being such that a circumferential section of the secondary bundle only is capable of being contacted and traversed by the hot gasses generated by the burner of the primary bundle, while the remaining section is capable of being contacted and passed through only by the hot gases generated by the burner of the additional primary bundle.

2. Exchanger according to claim 1, characterized in that the axes (A-A'), (B-B') and (C-C') of the three bundles, and are located in the same plane (Z), and the secondary bundle is arranged between the two primary bundles.

3. Exchanger according to claim 2, characterized in that said partition extends diametrically with respect to the secondary bundle, perpendicularly to said plane (Z).

4. Exchanger according to either one of claim 2 or 3, characterized in that said plane (Z) is vertical.

5. Exchanger according to any one of claim 1 to 3, characterized in that the three bundles are similar, with the same length and the same diameter.

6. Exchanger according to any one of claim 1 to 3, characterized in that said casing includes a planar facade, called a front facade, perpendicular to the axes (A-A'), (B-B') and (C-C') of the three bundles, to which said burners are attached.

7. Exchanger according to any one of claim 1 to 3, characterized in that it comprises means for controlling the supply of each burner with fuel.

8. Exchanger according to claim 7, characterized in that said control means include a closing valve such as a pivoting flap capable of preventing or, on the contrary, allowing fuel to be supplied to the associated burner.

9. Exchanger according to claim 1, characterized in that said casing includes a planar facade, called a rear facade, perpendicular to the axes (A-A'), (B-B') and (C-C') of the three bundles, which is traversed by an opening centered on the axis (C-C') of the secondary bundle and is bordered by said sleeve.

10. Exchanger according to claim 9, characterized in that said partition has, on the side of said rear facade, a free edge that is slightly inserted into said opening and/or into the sleeve.

11. Exchanger according to claim 1, characterized in that said bundles are helical tube windings.

12. Exchanger according to claim 11, characterized in that the tubes constituting the helical windings have a planar and/or oval cross-section, of which the large axis is approximately perpendicular to the axis of the winding.

13. Exchanger according to claim 12, characterized in that the gap separating two coils of the winding has a width (k) substantially smaller than the width (i) of the tube.

14. Exchanger according to any one of claim 11 to 13, characterized in that each tubular winding constituting a bundle is constituted by a series of N identical modules placed end-to-end.

15. Exchanger according to claim 14, characterized in that it is equipped with a transfer system for fluid, in particular water, traveling through the exchanger, which includes:

a) on a side of the casing:
- a first collection tank subdivided into two separate chambers by a partition, one called an upstream chamber, provided with an end piece capable of being connected to a conduit for supplying the fluid to be heated, and the other called a downstream chamber;
- a second collection tank subdivided into two separate chambers by a partition, one called an upstream chamber, and the other called a downstream chamber, provided with an end piece capable of being connected to a conduit for discharge of the heated fluid;
- wherein said upstream and downstream chambers are connected to one another by tubing;

b) on the other side of the casing:
- a third collection tank formed by two chambers partially separated by an incomplete partition, one called an upstream chamber, and the other called a downstream chamber, which two chambers can communicate with one another through a passage with a limited cross-section located at the end of the partition;
- a fourth collection tank formed by two chambers partially separated by an incomplete partition, one called an upstream chamber, and the other called a downstream chamber, which two chambers can communicate with one another through a passage with a limited cross-section located at the end of the partition;
- wherein said upstream chambers are connected to one another by tubing; and:

first, the N modules comprising the secondary winding are mounted in parallel, with their inlet connected to the upstream chamber of the first collection tank and their outlet connected to the upstream chamber of the fourth collection tank;

second, a certain number Nb of modules comprising one of the two primary windings are mounted in parallel, with their inlet connected to the upstream chamber of the first collection tank and their outlet connected to the upstream chamber of the fourth collection tank, while the rest N−Nb of the modules comprising this primary winding are mounted in parallel, with their inlet connected to the downstream chamber of the fourth collection chamber and their outlet connected to the downstream chamber of the first collection tank;

third, a certain number Na of modules comprising the other primary winding are mounted in parallel, with their inlet connected to the upstream chamber of said second collection tank and their outlet connected to the upstream chamber of the third collection tank, while the rest N−Na of the modules comprising this primary winding are mounted in parallel, with their inlet connected to the downstream chamber of the third collection chamber and their outlet connected to the downstream chamber of the second collection tank.

16. Exchanger according to claim 15, characterized in that said numbers Na and Nb are equal.

17. Exchanger according to claim 15, characterized in that N is an even number and Na+Nb=N/2.

18. Exchanger according to claim 15, characterized in that the tubing that connects the upstream chambers of the first and second collection tanks together and the tubing that connects the upstream chambers of the third and fourth collection tanks together are each provided with a valve capable of being closed, which makes it possible to isolate the circuit from one of the two primary exchangers when only the other primary exchanger is being operated.

19. Heat exchanger comprising a pair of primary tubular bundles surrounding a fuel or gas burner and a secondary tubular bundle on which condensation of the steam contained in the burned gases discharged from the primary bundles occurs, wherein the three bundles are mounted parallel, side-by-side inside a gas-tight casing, and communicate with one another, with means being provided in order to circulate the water to be heated, between the tubes forming the secondary bundle and the tubes forming the primary bundles, which exchanger is characterized in that the casing is subdivided at the level of the secondary bundle by a partition that extends both inside and outside said bundle, with the arrangement being such that a only a circumferential section of the latter is capable of being contacted and traversed by the hot gases coming from one of the two primary bundles, and its remaining section being capable of being contacted and traversed only by the hot gases coming from the other primary bundle.

20. Gas or fuel boiler including an exchanger consistent with claim 1 or claim 19 and which is provided with a pair of burners each equipped with means for controlling the fuel supply.

21. Series boilers, characterized in that it comprises at least two boilers according to claim 20, which are connected to the same heating circuit including channels supplying the water to be heated and sending out the hot water.

* * * * *

UNITED STATES PATENT AND TRADEMARK OFFICE
CERTIFICATE OF CORRECTION

PATENT NO. : 7,909,005 B2
APPLICATION NO. : 12/072913
DATED : March 22, 2011
INVENTOR(S) : Joseph Le Mer and Rocco Giannoni It is certified that error appears in the above-identified patent and that said Letters Patent is hereby corrected as shown below:

Cover Page, thirteenth line of ABSTRACT, delete first occurrence of "a".
Column 2, line 11, "pas" should read --pass--.
Column 2, line 24, delete "," after the word --applicant--.
Column 2, line 67, insert --,-- after the word --is--.
Column 6, line 44, delete "," after the word --sizes--.
Column 9, line 46, "figures and 6" should read --figures 5 and 6--.
Column 10, line 32, after "(Nb=3)" insert the word --open--.
Column 14, line 4, after "$9'b$" insert --,--.
Column 15, line 13, "tube" should read --tubes--.
Column 15, line 30, "ca," should read --can,--.
Column 16, line 33, "bundles, and are" should read --bundles are--.
Column 16, line 44, "claim" should read --claims--.
Column 16, line 49, "claim" should read --claims--.
Column 17, line 8, "claim" should read --claims--.
Column 18, line 39, delete "a" after the word --that--.
Column 18, line 48, "it comprises" should read --they comprise--.

Signed and Sealed this
Twenty-eighth Day of August, 2012

David J. Kappos
*Director of the United States Patent and Trademark Office*